United States Patent [19]

Halek

[11] Patent Number: 5,112,189

[45] Date of Patent: May 12, 1992

[54] ARRANGEMENT FOR CONNECTING BLOWER WHEEL

[75] Inventor: Werner Halek, Menden, Fed. Rep. of Germany

[73] Assignee: Schmetz GmbH & Co KG Unternehmensverwaltung, Menden, Fed. Rep. of Germany

[21] Appl. No.: 503,723

[22] Filed: Apr. 3, 1990

[30] Foreign Application Priority Data

Apr. 3, 1989 [DE] Fed. Rep. of Germany ....... 3910674

[51] Int. Cl.$^5$ ............................ F03B 13/00; F01D 1/00
[52] U.S. Cl. ................... 415/200; 415/216.1; 403/337; 416/204 R; 432/176
[58] Field of Search .............. 415/200, 206, 213.1, 415/214.1, 216.1, 217.1, 218.1, 229, 110; 417/423.1, 423.11; 403/335, 337, 28, 30; 416/204, 223 B; 432/176, 205

[56] References Cited

U.S. PATENT DOCUMENTS

| | | | |
|---|---|---|---|
| 1,555,023 | 9/1925 | Prokofieff | 415/110 |
| 2,905,093 | 9/1959 | Raub et al. | 415/200 |
| 4,099,890 | 7/1978 | Murakami et al. | 415/200 |
| 4,536,127 | 8/1985 | Rossmann et al. | 415/197 |

FOREIGN PATENT DOCUMENTS 1428201 12/1968 Fed. Rep. of Germany.

Primary Examiner—Edward K. Look
Assistant Examiner—Hoang Nguyen
Attorney, Agent, or Firm—Michael J. Striker

[57] ABSTRACT

An arrangement for connecting a heat-resistant blower wheel located in a oven comprises a hollow projection formed on a wheel at its side facing toward a motor and provided with a coaxial flange, a metal disc connectable with a perpendicularly extending motor shaft, the wheel and the projection being composed of a heat-resistant material, and a disc-shaped element located between the flange and the disc in the region of their connection and formed as a springly element.

5 Claims, 1 Drawing Sheet

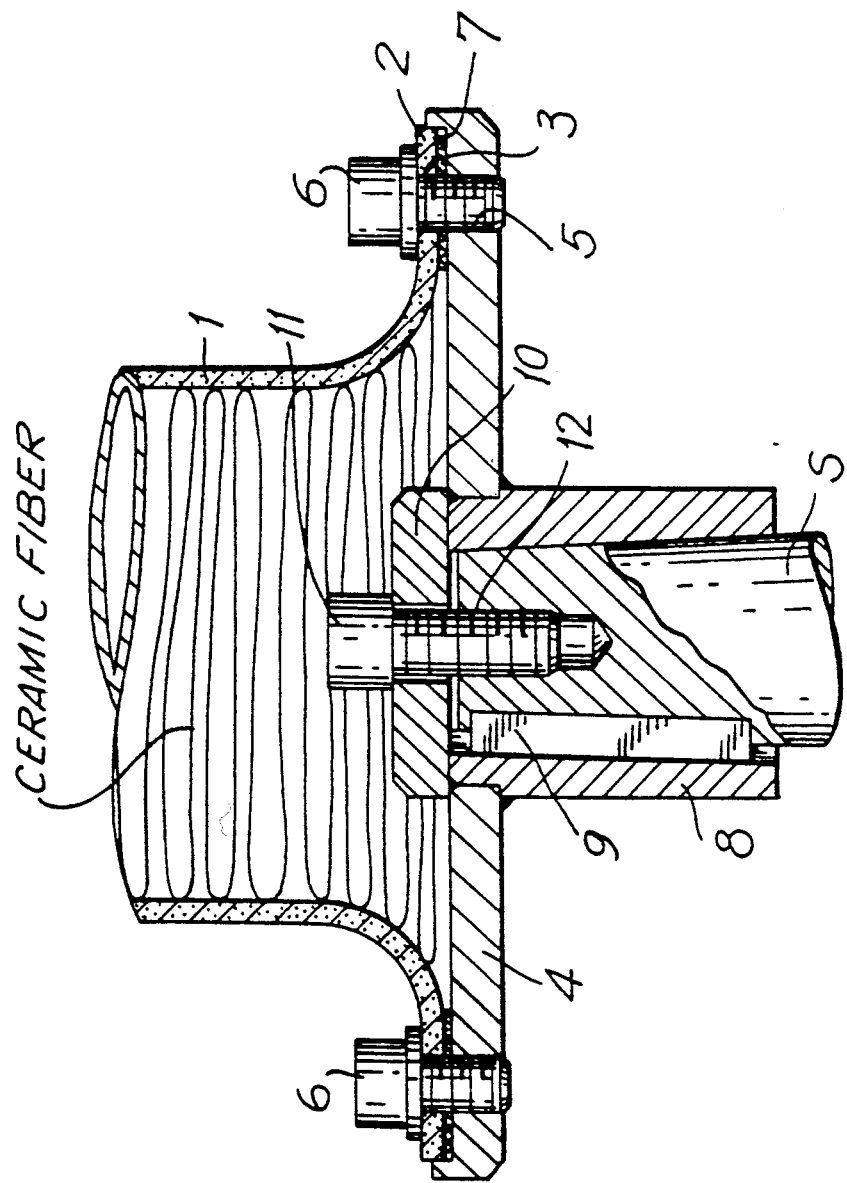

ARRANGEMENT FOR CONNECTING BLOWER WHEEL

BACKGROUND OF THE INVENTION

The present invention relates to an arrangement for connecting a heat-resistant blower wheel located inside an oven.

More particularly, it relates to an arrangement for connecting a heat-resistant blower wheel which has a coaxial hollow projection provided at the side of the motor and filled with a ceramic fiber mass, and a coaxial flange arranged at its end and screwed with a metallic disc or ring with a perpendicularly extending motor shaft.

Arrangements of the above mentioned general type are known in the art. One of such arrangements is disclosed, for example in the German document DE-OS 1,428,201. In this arrangement the hollow projection of the wheel at the side facing toward the motor shaft is filled with an insulating material, for example mineral wool or glass wool. This reduces the heat transfer from the blower wheel operating in the hot gases, to the motor drive shaft connected with it. The insulating material reduces the passage of the heat through the cylindrical side wall of the projection of the flange connected with the wheel. The material of the flange connected with the blower wheel is temperature loaded with the blower wheel and is the same as the disc which is seated on the motor shaft connected by screws with one another. Therefore the heat transfer from the flange through the projection to the motor shaft is not sufficiently prevented, and the use of this arrangement is limited to temperatures which do not exceed 300° C.

SUMMARY OF THE INVENTION

Accordingly, it is an object of the present invention to provide an arrangement for connecting a blower wheel, which avoids the disadvantages of the prior art.

More particularly, it is an object of the present invention to provide an arrangement for connecting a blower wheel of the above mentioned type, which insures a reliable and firm holding with an optimal transmission of the torque and at the same time avoids thermal stresses in the region of the connection of the blower wheel with the motor shaft.

It is also an object of the present invention to provide such an arrangement which simultaneously prevents withdrawal of the heat from the blower wheel to the motor shaft.

In keeping with these objects and with others which will become apparent hereinafter, one feature of the present invention resides, briefly stated, in a connection for a blower wheel, in accordance with which the wheel and the hollow projection of the wheel are composed of a heat-resistant material, and a disc-shaped heat-resistant element is located between a flange of the wheel and a disc of a motor shaft.

More particularly, the wheel and the projection are composed of carbon fiber-reinforced graphite, and the heat-resistant element is composed of a graphite laminate and formed as a spring element.

A sufficient movement of the materials in the connecting region is obtained, when in the region of the mounting screws between the flange and the disc a disc-shaped graphite laminate is inserted in form of a springy element. The blower connection is located behind the heat dam. However, it is heated by the loss energy escaping through the shaft and exiting through the passage gap in the heat dam, so that in a hot oven the thermal expansion of the metal parts in particular the disc and the screws occurs or shrinkage takes place during cooling of the oven. As a result, the screws are blocked when a non-elastic element is used for uniform tensioning of the screws, as in the prior art.

A simple connection of the motor shaft is achieved when a bush is provided on the disc and more particularly at its end facing away of the wheel, so that this shaft end extends into the bush in a form-locking manner.

It is especially advantageous when the hollow space of the projection is filled with a ceramic fiber mass. The ceramic fiber mass in the hollow space of the projection maintains the heat passage from the blower to the blower connection at a minimum degree.

An important advantage of the invention in addition to the continuous blower connection, is also in that it maintains a passage of the blower shaft through the heat dam which has low heat losses. Also, a high stability obtained due to the low weight of the wheel projection.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing an axial section of an arrangement for connecting a blower to a motor shaft, in accordance with the present invention.

DESCRIPTION OF A PREFERRED EMBODIMENT

A radial blower has a wheel or an impeller located in an oven chamber. One side of the wheel is provided with a coaxial hollow projection, which is identified with reference numeral 1. The projection 1 expands at its free end and forms a coaxial flange 2.

The flange 2 is provided with a plurality of openings 3 which are arranged preferably at uniform distances from one another. The openings 3 are utilized for a screw connection as will be explained hereinbelow. The projection 1 of the wheel is composed of a heat-resistance material, in particular a carbon-fiber reinforced graphite. The inner space of the projection 1 is filled with a heat-resistant material, in particular a ceramic fiber mass.

A motor shaft of the blower is identified as S. A metal disc 4 is supported by the motor shaft S and provided with a plurality of threaded openings 5. The threaded openings 5 of the disc 4 are arranged in alignment with the openings 3 of the flange 2. The ring-shaped flange 2 of the projection 1 is connected with the metal disc 4 of the motor shaft S by a plurality of screws 6 which are screwed through the openings 3 of the flange 2 into the threaded openings 5 of the disc 4. Thereby, the flange 2 and the disc 4 are clamped together.

Ring-shaped or disc-shaped elements 7 formed for example as spacing discs are located between the disc 4 and the flange 2 and surround the screws 6. The elements 7 are composed of a graphite laminate which has a springy property, to maintain a tension between the flange 2 and the disc 4 under the action of the pressure applied by the screws 6. This mounting with the graphite laminate elements 7 permits limited movements of the flange 2 relative to the disc 4 in a radial and an axial direction.

For providing a simple and reliable mounting of the motor shaft S on the disc 4, a bush 8 is mounted on the disc 4 coaxially and at a side opposite to the blower. It has an inner surface which reduces conically inwardly. A correspondingly conically shaped end of the motor shaft is inserted in the bush 8. A torque is transmitted from the motor shaft to the bush through a key 9. The inner end of the bush 8 is closed by a pressure disc 10. A screw 11 extends coaxially through the pressure disc 10 and is screwed in a threaded opening 12. The threaded opening 12 extends from an end side of the shaft into the shaft coaxially with the latter.

It will be understood that each of the elements described above, or two or more together, may also find a useful application in other types of constructions differing from the types described above.

While the invention has been illustrated and described as embodied in an arrangement for connecting a heat-resistant blower wheel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for connecting a heat-resistant blower wheel located in a oven, comprising a hollow projection formed on a wheel at its side facing toward a motor and provided with a coaxial flange; a metal disc connectable with a perpendicularly extending-motor shaft, said wheel and said projection being composed of carbon-fiber reinforced graphite; and a disc-shaped element located between said flange and said disc in the region of their connection and formed as a springy element and composed of a graphite laminate.

2. An arrangement as defined in claim 1; and further comprising means for connecting said flange with said disc and including mounting screws, said disc-shaped element being located in the region of said mounting screws.

3. An arrangement as defined in claim 1, wherein said hollow projection is filled with a ceramic fiber mass.

4. An arrangement as defined in claim 1, wherein said disc has a side facing away of said wheel and provided with a hollow bush for receiving an end of a motor shaft in a form-locking manner.

5. An arrangement as defined in claim 4, wherein said bush has a conically inwardly reducing opening for receiving the end of the motor shaft.

* * * * *